(12) United States Patent
Asao et al.

(10) Patent No.: US 6,357,290 B1
(45) Date of Patent: *Mar. 19, 2002

(54) MOUNT CONSTRUCTION OF A WEAR DETECTION PROBE FOR A BRAKE LINING MEMBER

(75) Inventors: Kazuhiro Asao, Yokkaichi; Kouji Takahashi, Itami, both of (JP)

(73) Assignee: Sumitomo Wiring Systems, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/281,160

(22) Filed: Mar. 30, 1999

(30) Foreign Application Priority Data

Apr. 1, 1998 (JP) .............................. 10-088713

(51) Int. Cl.⁷ .............................. G01L 5/28; F16D 66/02
(52) U.S. Cl. .............................. 73/129; 33/610; 340/454
(58) Field of Search .................. 73/121, 129; 116/28 R; 340/425.5, 438, 453, 454; 33/600, 609, 610

(56) References Cited

U.S. PATENT DOCUMENTS

| 3,662,863 A | | 5/1972 | Dombeck |
| 4,147,236 A | * | 4/1979 | Steffen et al. |
| 4,391,350 A | | 7/1983 | Moriya |
| 4,869,350 A | * | 9/1989 | Fargier et al. |
| 5,454,450 A | * | 10/1995 | Tanigawa .................... 73/129 |
| 5,833,033 A | * | 11/1998 | Takanashi |
| 6,065,359 A | * | 5/2000 | Takanashi et al. ............ 73/129 |
| 6,095,290 A | * | 8/2000 | Takanashi |

FOREIGN PATENT DOCUMENTS

| DE | 739 016 | 9/1943 |
| DE | 27 50 264 | 5/1979 |
| GB | 2 264 173 | 8/1993 |
| JP | 6-30543 | 4/1994 |

* cited by examiner

Primary Examiner—Eric S. McCall
(74) Attorney, Agent, or Firm—Anthony J. Casella; Gerald E. Hespos

(57) ABSTRACT

A wear detection probe is provided to cushion an impact from a rotor to the wear detection probe and to hold the wear detection probe in a specified position during the contact with the rotor. For these purposes, a biasing mount plate 16 is formed with biasing pieces 21. A stopper mount plate 15 is formed with stopper pieces 19, and a wear detection probe 10 is provided with locking pins 14. When being subjected to an impact from a rotor R, the wear detection probe 10 moves backward while the biasing pieces 21 undergo an elastic deformation by being pushed by the locking pins 14, with the result that the impact is cushioned. When the wear detection probe 10 moves backward, the locking pins 14 come into contact with the stopper pieces 19 and, accordingly, the wear detection probe 10 is held in contact with the rotor R while being held in the specified position.

16 Claims, 10 Drawing Sheets

MOUNT CONSTRUCTION OF A WEAR DETECTION PROBE FOR A BRAKE LINING MEMBER

BACKGROUND OF THE INVENTION

1. Field of the Invention.

The present invention relates to a mount construction of a wear detection probe for detecting a wear of a brake lining member.

2. Description of the Related Art.

A wear detection probe for a brake lining member of an automotive vehicle detects when wear of the brake lining member has reached its operating limit. A mount construction for such a wear detection probe is disclosed in Japanese Unexamined Utility Model Publication No. 6-30543, and is shown in FIG. 14. The prior art probe of FIG. 14 has a support member 2 formed with a forked raised portion 2B having a curved portion 2A at its leading end. The support member 2 is fixed to the upper surface of a backplate 1 by a set screw 3. A compression spring 5 is accommodated in a mount hole 4 of the backplate 1 and a wear detection probe 6 is inserted into the mount hole 4 of the backplate 1. The wear detection probe 6 has a locking pin 6A that is engaged with the curved portion 2A by the elastic restoring force of the compression spring 5 so as to hold the wear detection probe 6 while restricting it from moving upwardly and downwardly. In this mounted state, the bottom end of the wear detection probe 6 projects downward through the mount hole 4. The lining member 7 and the wear detection probe 6 progressively abrade from the bottom surface of the lining member 7 by contact with a rotor (not shown). A lead wire (not shown) is embedded in the wear detection probe 6 and also will be abraded after sufficient abrasion of the bottom end of the wear detection probe 6 by the rotor. Eventually, the lead wire will be cut by the abrasive action of the rotor to indicate that the lining member 7 has worn to its operating limit.

When the rotor contacts the prior art wear detect ion probe 6, the wear detection probe 6 may instantaneously be subjected to an impact and cut since the rotor is rotating a t high speed. It is desirable that the wear detection probe 6 be moved elastically upwardly in order to cushion the impact. It is also desirable that the lead wire be abraded and cut by the rotor with the wear detection probe 6 elastically held.

On the other hand, since the vertical position of the prior art wear detection probe 6 serves as a detection reference position for the wear limit, the wear detection probe 6 needs to be brought into contact with the rotor while being held in a specified position even after being moved to an uppermost position to cushion the impact.

Since the single raised portion 2B alone provides both the cushioning function and the holding function in the prior art mount construction, the holding function is disadvantageously degraded if the raised portion 2B is made easy to undergo an elastic deformation by prioritizing the cushioning function. Conversely, the cushioning function is disadvantageously degraded if the rigidity of the raised portion 2B is enhanced by prioritizing the holding function.

Further, it is necessary to protect the cushioning function of the raised portion 2B by preventing the raised portion 2B from being excessively deformed beyond its elasticity limit when an external force acts on the lead wire during a mount operation. The prior art mount construction is not provided with such a protection means.

The present invention was developed in view of the above problems, and an object thereof is to attain a function of cushioning an impact given from a rotor to a wear detection probe, a function of holding the wear detection probe in a specified position during the contact with the rotor, and a function of protecting the cushioning function against an external force.

SUMMARY OF THE INVENTION

According to the invention, there is provided a mount construction of a wear detection probe that detects when a brake lining member has reached its operating limit. A detection wire is provided in the wear detection probe and is abraded and cut by a rotor to produce a signal indicating that wear of the brake lining has reached its operating limit. The mount construction includes a locking means provided at the wear detection probe. A biasing means is engaged with the locking means for substantially elastically pushing the wear detection probe to receiving means on the brake lining. A stopper means is provided for restricting a backward movement of the wear detection probe. The stopper means is brought substantially into contact with the locking means when the wear detection probe moves backward against a biasing force of the biasing means by the action of an external force.

The flexible rigidity of the biasing means preferably is set smaller than that of the stopper means.

According to a preferred embodiment, a backplate is provided for fixedly supporting the brake lining member and supporting the wear detection probe so as to be movable along forward and backward directions while being located opposite to the rotor.

Preferably, a receiving means is provided or is providable at the backplate for restricting a forward movement of the wear detection probe toward the rotor.

According to a further embodiment, there is provided a mount construction of a wear detection probe that detects when a brake lining member has reached its operating limit. The wear detection probe includes a detection wire that abrades and eventually is cut by a rotor to produce a signal to indicate that the brake lining has reached its operating limit. The mount construction includes a backplate for fixedly supporting the brake lining member and for supporting the wear detection probe so that the wear detection probe is movable along forward and backward directions while being located opposite to the rotor. A receiving means is provided at the backplate for restricting a forward movement of the wear detection probe toward the rotor. A locking means is provided at the wear detection probe, and a biasing means is engageable with the locking means for elastically pushing the wear detection probe to the receiving means. A stopper means is provided for restricting a backward movement of the wear detection probe by contacting the locking means when the wear detection probe moves backward against a biasing force of the biasing means by the action of an external force.

The wear detection probe is subjected to an impact when brought into contact with the rotor. However the wear detection probe is retracted elastically against the biasing force of the biasing means to cushion the impact. The detection wire is abraded and eventually cut by the rotor with the wear detection probe elastically held. The wear detection probe initially may move backward without the detection wire being cut. However, the stopper means limits backward movement, and hence the detection wire is cut with the wear detection probe held in a specified position by the stopper means. Accordingly, a premature breakage of the wear detection probe can be prevented, and a detection reference position for the wear limit can be maintained. Further, since the stopper means prevents the biasing means from being excessively deformed beyond its elasticity limit, the cushioning function of the biasing means can be protected.

Preferably, the biasing means comprises a biasing piece formed at a biasing mount plate fixed to the backplate, and the stopper means comprises a stopper piece formed at a stopper mount plate fixed to the backplate. The thickness of the biasing mount plate is set different from, preferably smaller than, that of the stopper mount plate.

Since the biasing means and the stopper means are formed at the separate mount plates, the cushioning function by the biasing means and the holding function by the stopper means can be performed well and can be set with high degree of freedom. Further, there is less likelihood of losing parts as compared to a case where the biasing means and the stopper means are separate parts from the biasing mount plate and the stopper mount plate and are independently mounted on the backplate without using a fixing means.

Both the biasing means and the stopper means preferably are formed as elastic pieces or projections on a single mount plate, preferably are fixed to the backplate. Additionally the elastic pieces preferably have different lengths. The biasing means may extend in a direction intersecting with the moving direction of the wear detection probe and may have the locking means engaged with the free end thereof. Furthermore the stopper means may project along the moving direction of the wear detection probe and may have the locking means engaged with the free end thereof.

Since the biasing means extends in the direction intersecting the moving direction of the wear detection probe and has the locking means engaged with the free end thereof, it is likely to be elastically deformed and performs a proper cushioning function. On the other hand, since the stopper means projects along the moving direction of the wear detection probe and has the locking means engaged with the free end thereof, it is hard to be elastically deformed and performs a high level of holding function. Further, since only the single mount plate is used, a production cost can be reduced. There is less likelihood of losing parts and the number of parts can be smaller as compared to a case where the biasing means and the stopper means are parts separate from the mount plate and are independently mounted on the backplate.

A plurality of locking means may project in circumferentially spaced positions at the periphery of the wear detection probe. Additionally the biasing means and the stopper means may be arranged in positions circumferentially displaced from each other or substantially corresponding to positions of the respective locking means to interact with (preferably more than two) corresponding locking pins of the wear detection probe.

Since the biasing means and the stopper means are arranged in positions circumferentially displaced from each other, the projecting length of the locking means can be shortened as compared to a case where the biasing means and the stopper means are arranged at the inner and outer sides in the same circumferential position. Further, a space required for arranging the biasing means and the stopper means can be made smaller.

Most preferably, at least one of the biasing means and the stopper means is provided with a loose movement restricting means for permitting the locking means to be displaced to engagement positions with the biasing means and the stopper means as the wear detection probe is rotated and restricting a loose movement of the locking means in the engagement positions.

By providing the loose movement restricting means for the wear detection probe, the locking means can be set on the biasing means and the stopper means and the set state can be maintained securely.

These and other objects, features and advantages of the present invention will become more apparent upon a reading of the following detailed description and accompanying drawings.

DETAILED DESCRIPTION OF THE PREFERRED EMBODIMENTS

Figure 1:
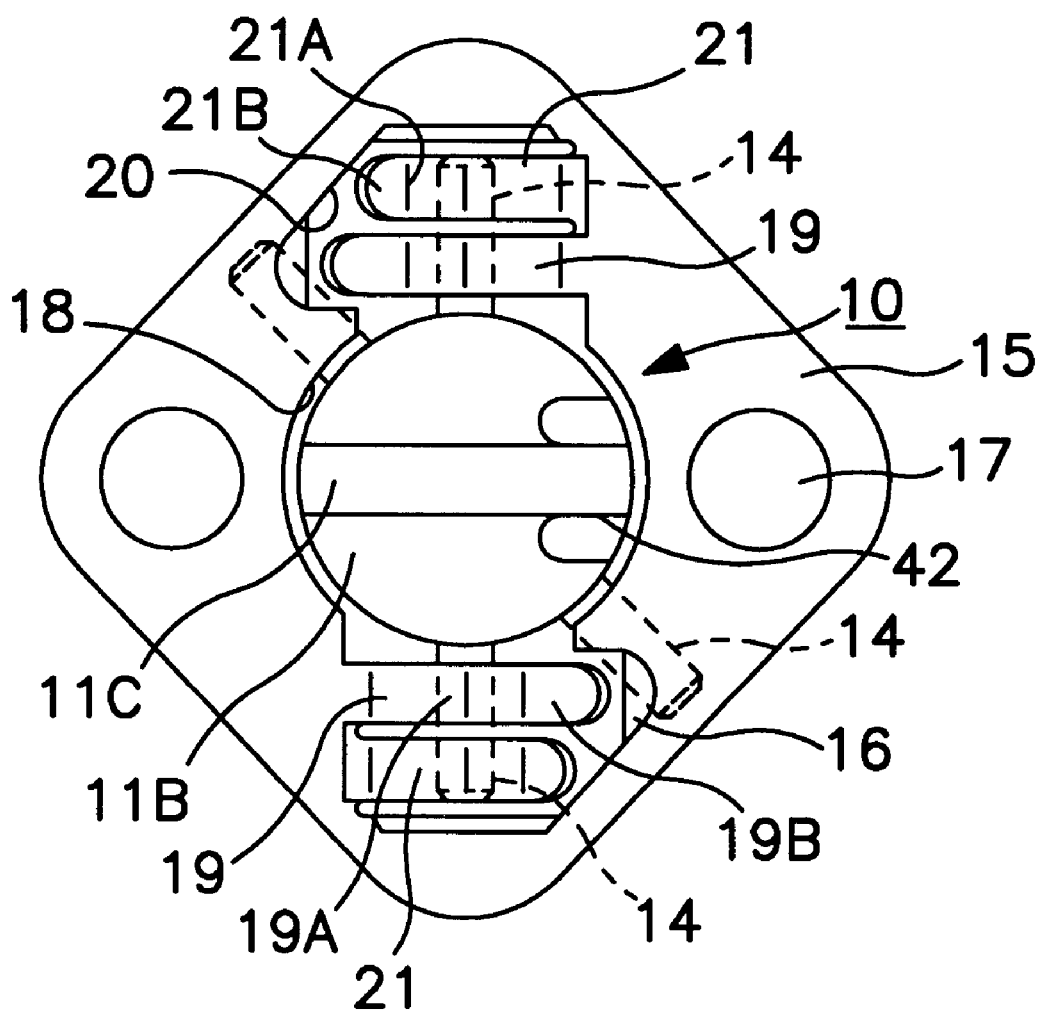
FIG. 1 is a rear view of a first embodiment.

A wear detection probe 10 according to a first embodiment is illustrated in FIGS. 1–4 and is identified by the numeral 10. The wear detection probe 10 is comprised of a substantially cylindrical holder 11, e.g. made of a resin, and a detection wire 12 arranged in the holder 11. The detection wire 12 has a folded portion 12A at the front end of the holder 11. This folded portion 12A is cut by a rotor R when a brake lining member B is abraded to a predetermined or predeterminable level or degree. A front part, preferably half, of the holder 11 is a small diameter portion 11A. A large diameter portion 11B is formed continuously with the small diameter portion 11A, and a rib 11C is formed at the rear end of the large diameter portion 11B. The front end surface of the large diameter portion 11B serves as a contact surface 13 extending in a direction at an angle different from 0° or 180°, preferably substantially normal to the longitudinal direction of the holder 11.

Two locking pins 14 (locking means) project from the outer circumferential surface of the large diameter portion 11B and are spaced apart by an angle more than 0°, preferably substantially 180°. The locking pins 14 may be formed by a single metal pin made integral to the holder 11 by insert-molding, may be inserted into insertion holes formed in the holder 11, or may be integrally made of a resin with the holder 11. It should be noted that the locking pins 14 are arranged in positions to avoid a wire arrangement groove 42 formed in the outer surface of the holder 11 and substantially extending along a longitudinal direction thereof or forward and backward directions F/B.

A disk brake on which the wear detection probe 10 is mounted or mountable is made of a brake lining member B for tightly holding the opposite surfaces of the disk-shaped rotor R which rotates together with an unillustrated wheel, and a backplate S to which the brake lining member B is fixed. The backplate S and the brake lining member B are formed with round mount holes Sh, Bh in such positions that the mount holes Sh, Bh can substantially be in alignment with each other, respectively. The wear detection probe 10 according to this embodiment is mounted or mountable in these mount holes Sh, Bh.

The mount hole Sh of the backplate S has its diameter enlarged at a rear surface, which is the side opposite from the brake lining member B (upper side of FIGS. 2 to 4), thereby forming a stepped portion in the inner wall thereof. A surface formed by enlarging the diameter serves as a receiving surface Sr (receiving means). When the contact surface 13 of the wear detection probe 10 is brought substantially into contact with the receiving surface Sr, a forward movement of the wear detection probe 10 is restricted. In this regard, a forward movement is in a direction toward the rotor R or downward in FIGS. 2–4.

A stopper mount plate 15 and a biasing mount plate 16 are used to mount the wear detection probe 10 on the disk brake. Both mount plates 15, 16 preferably are made of the same metal, and the thickness of the biasing mount plate 16 is preferably smaller than that of the stopper mount plate 15. The mount plates 15, 16 are fixed to the backplate S by mount members 17 (e.g. bolts) while being placed one after the other with the biasing plate 16 located in front. In this state, the biasing mount plate 16 is substantially in contact with the rear surface of the backplate S.

The mount plates 15, 16 are formed with substantially round through holes 18 which can be in alignment with the mount hole Sh. The wear detection probe 10 is or can be inserted into and withdrawn from the mount holes Sh, Bh through the through holes 18, and the large diameter portion 11B and the rib 11C project backwardly from the backplate S in the mounted state of the wear detection probe 10.

Figure 2:
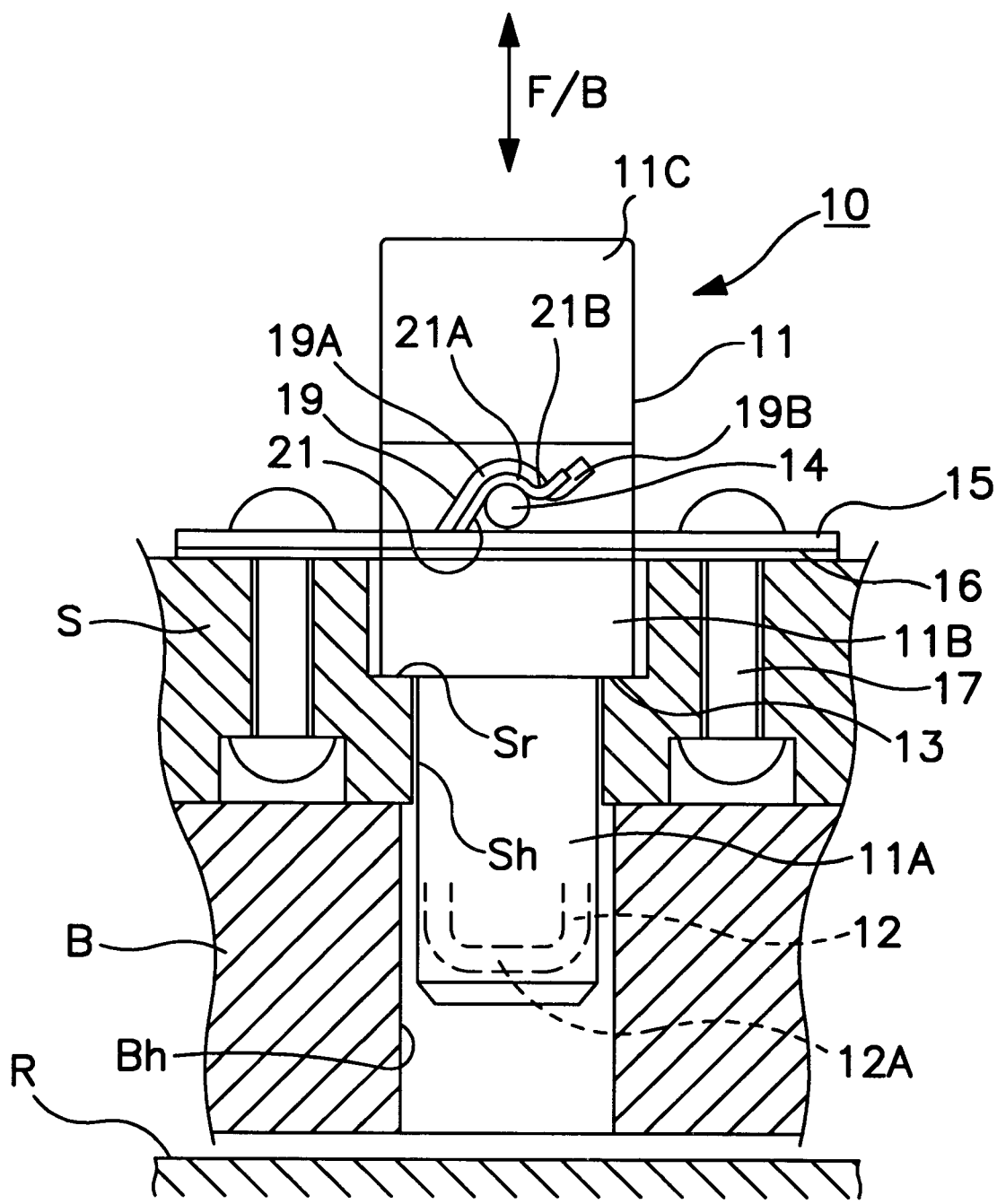
FIG. 2 is a section of the first embodiment.
Figure 3:
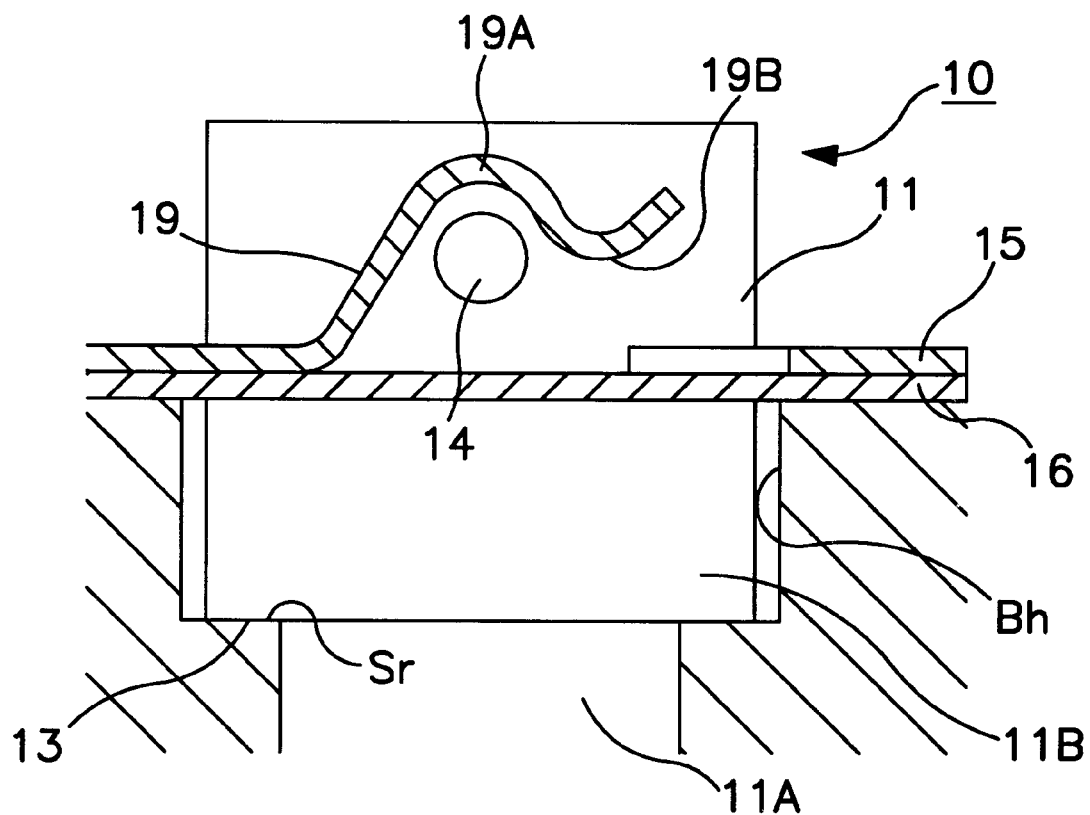
FIG. 3 is a partially enlarged section showing the relative positions of stopper pieces and locking pins of the first embodiment.

A pair of stopper pieces 19 (stopper means) are formed to project in a same angular or rotational direction, e.g. in a substantially counterclockwise direction when viewed from behind. Additionally the stopper pieces 19 are spaced apart by a corresponding angular distance or angle e.g. by about 180° by making cuts along the edge of the through hole 18 and bending the cut portions (see FIG. 1). Each stopper piece 19 is bent obliquely as shown in FIG. 2 when viewed sideways, and a stopper portion 19A in the form of an arc substantially opening downwardly or away from the stopper mount plate 15 is formed at the free end of the stopper piece 19. Further, a loose movement restricting portion 19B (loose movement restricting means) in the form of an arc opening upwardly is formed at the leading end of the stopper portion 19A to restrict a loose movement of the wear detection probe 10.

The stopper pieces 19 are formed at the stopper mount plate 15 which preferably has a larger thickness than the biasing mount plate 16. Therefore, the stopper pieces are relatively unlikely to undergo an elastic deformation. Specifically, the stopper pieces 19 undergo a small degree of elastic deformation in response to a pushing force of the rotor R in a state where braking is continued, and have a rigidity to receive the locking pins 14.

Openings 20 are formed for biasing pieces 21 of the biasing mount plate 16 in an area outside of an area where the stopper pieces 19 are bent (preferably radially outside as seen with respect to the center of the through hole 18).

On the other hand, the biasing mount plate 16 is formed with a pair of biasing pieces 21 (biasing means), which are spaced apart preferably by 180° and extend in a direction, e.g. a counterclockwise direction similar to the stopper pieces 19. The biasing pieces 21 are formed by making cuts in portions of the biasing mount plate 16 substantially corresponding the openings 20 and bending the cut portions. The biasing pieces 21 preferably have substantially the same shape as the stopper pieces 19, and are bent obliquely. An elastic contact portion 21A is formed at the leading end of each biasing piece, and is in the form of an arc opening toward the biasing mount plate 16 or downward as shown in FIG. 2. A loose movement restricting portion 21B (loose movement restricting means) is formed at the leading end of the elastic contact portion 21A, and is in the form of an arc opening away from the biasing mount plate 16 or upward.

Since the biasing pieces 21 are formed at the biasing mount plate 16 preferably having a smaller thickness than the stopper mount plate 15, they have an elasticity sufficient to undergo an elastic deformation in response to an instantaneous impact created during the contact with the rotor R rotating at high speed as well as the pushing force of the rotor R in a state where braking is continued.

The wear detection probe 10 is assembled as follows. As indicated by chain line in FIG. 1, the holder 11 is inserted into the mount holes Sh, Bh through the through holes 18 such that the locking pins 14 are substantially located before the stopper pieces 19 and the biasing pieces 21 in a rotational direction, e.g. with respect to the counterclockwise direction. When the contact surface 13 is brought into contact with the receiving surface Sr, the rib 11C is gripped (by hand or by means of a tool) to rotate the holder 11 clockwise. Then, the locking pins 14 come substantially into contact with the loose movement restricting portions 19B, 21B, thereby being engaged with the elastic contact portions 21A while causing the stopper pieces 19 and the biasing pieces 21 to be elastically deformed (see FIG. 2). In this way, the wear detection probe 10 is mounted. At this time, since the locking pins 14 are strongly pushed toward the elastic contact portions 21A by the elastic restoring forces of the biasing pieces 21, an operator can easily notice the engagement of the locking pins 14 with the biasing pieces 21 and can have a satisfactory operation feeling.

In the mounted state, the wear detection probe 10 is held in a position where the contact surface 13 thereof is substantially in contact with the receiving surface Sr by the biasing forces of the biasing pieces 21. At this time, slight clearances are left between the locking pins 14 and the stopper portions 19A (see FIG. 3). Further, since the locking pins 14 are prevented from rotating in a disengaging direction by the loose movement restricting portions 21B of the biasing pieces 21, the wear detection probe 10 is held in a specified mount position. It should be noted that an arranging direction (transverse direction of FIG. 2) of the folded portion 12A of the detection wire 12 at this time is the same as the rotating direction of the rotor R.

As the abrasion of the brake lining member B progresses, the rotor R comes to contact the leading end of the wear detection probe 10. Since the rotor R is rotating at high speed at this time, the wear detection probe 10 is instantaneously subjected to an impact when being brought into contact with the rotor R. Then, the wear detection probe 10 moves backward or in a longitudinal direction out of the brake lining member B while causing the biasing pieces 21 to be substantially elastically deformed, thereby cushioning the impact.

The front end of the wear detection probe 10 continues to be abraded by the rotor R with the wear detection probe 10 elastically held by the biasing pieces 21, and the folded portion 12A of the detection wire 12 is abraded and cut by the rotor R with the wear detection probe 10 substantially elastically held.

Figure 4:
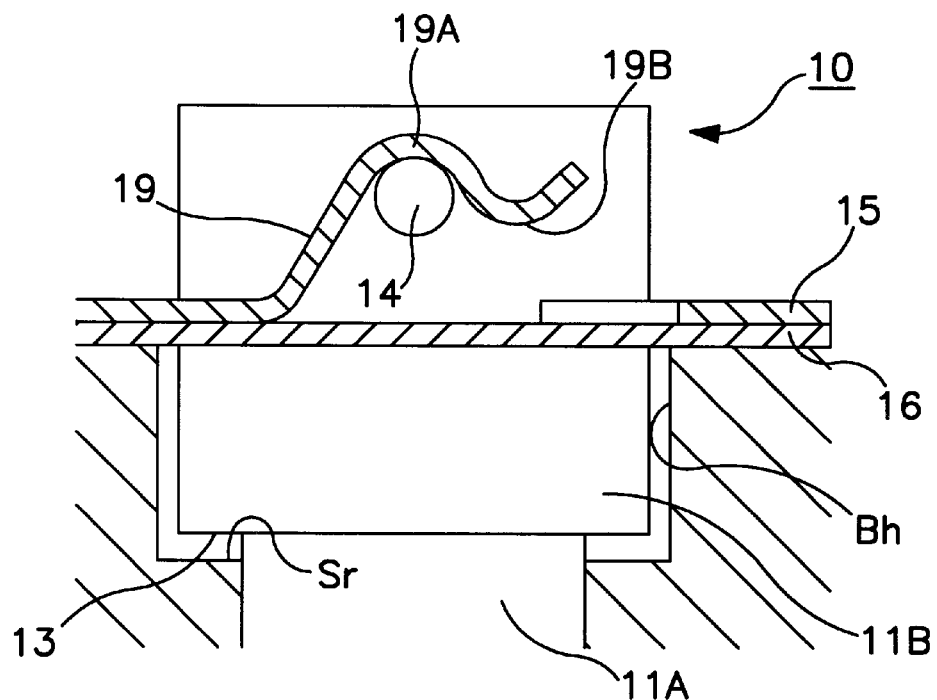
FIG. 4 is a partially enlarged section showing the relative positions of the stopper pieces and locking pins in a state where a wear detection probe is retracted in the first embodiment.

In the case that the wear detection probe 10 moves backward without the folded portion 12A being cut, the locking pins 14 come into contact with the stopper portions 19A (see FIG. 4). However, since the stopper pieces 19 have a rigidity against the pushing force of the rotor R, the wear detection probe 10 is not pushed backward or outside of the brake lining member B (upward in FIGS. 2 to 4) any further. In other words, the front end of the wear detection probe 10 is abraded by the rotor R with the locking pins 14 held in contact with the stopper portions 19A.

At this time, since the locking pins 14 are restrained from loosely moving in the counterclockwise direction by the loose movement restricting portions 19B of the stopper pieces 19, they can be held engaged with the stopper portions 19A. Thus the wear detection probe 10 can be held in position with respect to the longitudinal direction thereof or the forward and backward directions as well as with respect to the rotating direction.

When the folded portion 12A of the detection wire 12 is abraded sufficiently to cut the detection wire 12 as described above, it is detected that the wear of the brake lining member B has reached its operating limit.

Since the biasing pieces 21 and the stopper pieces 19 are provided in this embodiment, both the function of cushioning the impact from the rotor R rotating at high speed and the function of holding the wear detection probe 10 in the specified position when the wear of the brake lining member B has reached its limit can be realized.

Further, the cushioning function by the biasing pieces 21 can be protected since the excessive deformation of the biasing pieces 21 substantially beyond their elasticity limit can be prevented by the stopper pieces 19 having a high rigidity.

Furthermore, since the biasing pieces 21 and the stopper pieces 19 are separately formed at the mount plates 15, 16 having different thicknesses, high levels of the cushioning function by the biasing pieces 21 and the holding function by the stopper pieces 19 can be performed.

Further, since the biasing pieces 21 and the stopper pieces 19 are provided with the loose movement restricting portions 19B, 21B, respectively, the wear detection probe 10 can be held in the specified position regardless of whether or not it is in contact with the rotor R or even if an external force acting on the detection wire 12 acts thereon during the mount operation or the like.

Furthermore, since the biasing pieces 21 and the stopper pieces 19 are not mounted on the backplate S as separate parts, but are formed at the biasing mount plate 16 and the stopper mount plate 15, there is no likelihood of losing parts during mounting or detachment of the wear detection probe 10, thereby making mounting and detachment easier.

Figure 5:
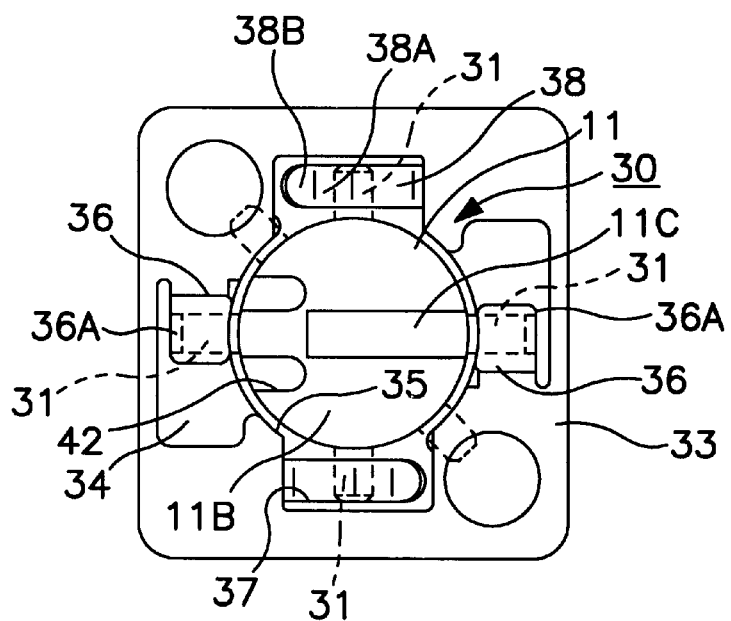
FIG. 5 is a rear view of a second embodiment.
Figure 6:
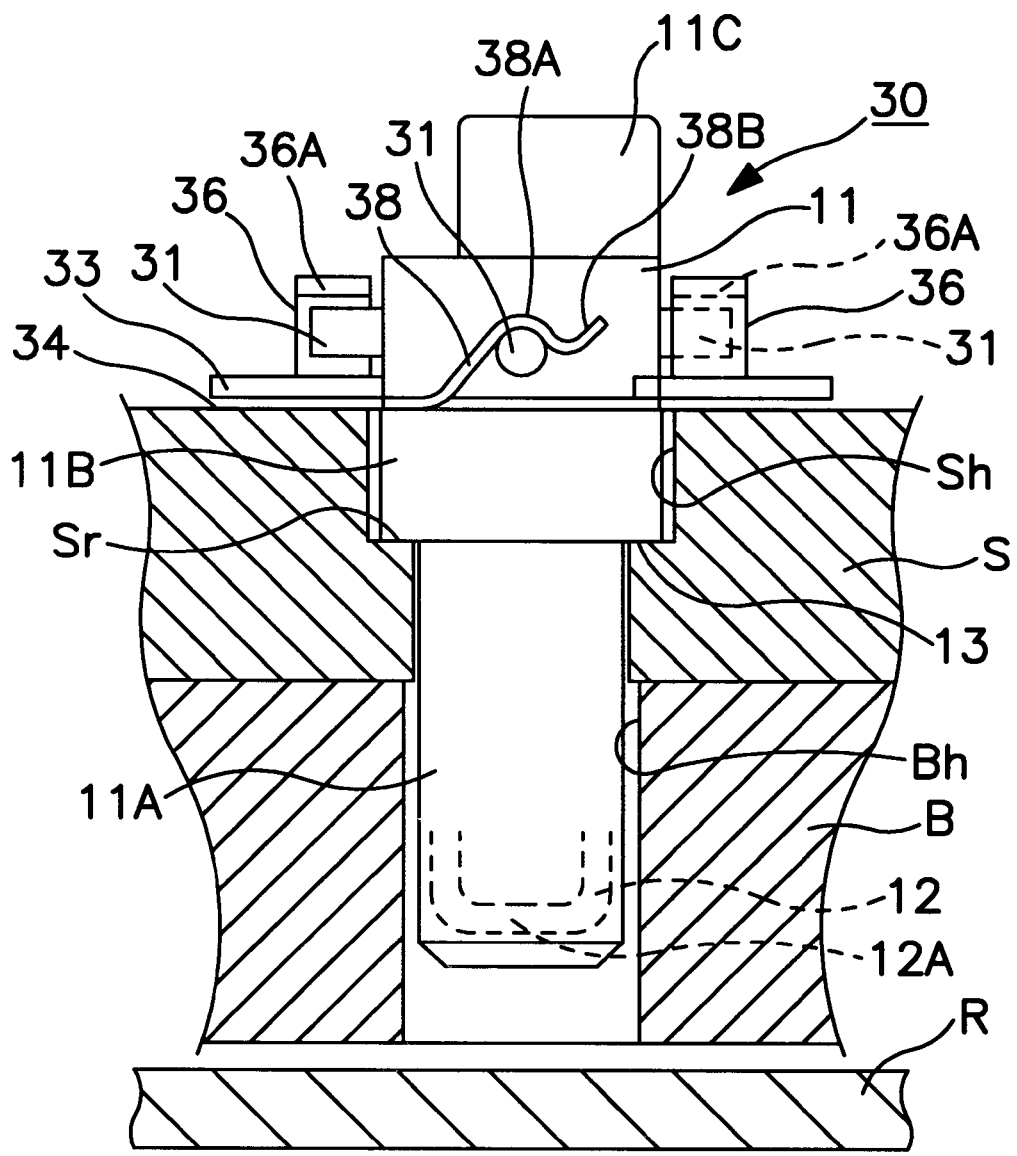
FIG. 6 is a section of the second embodiment.
Figure 7:
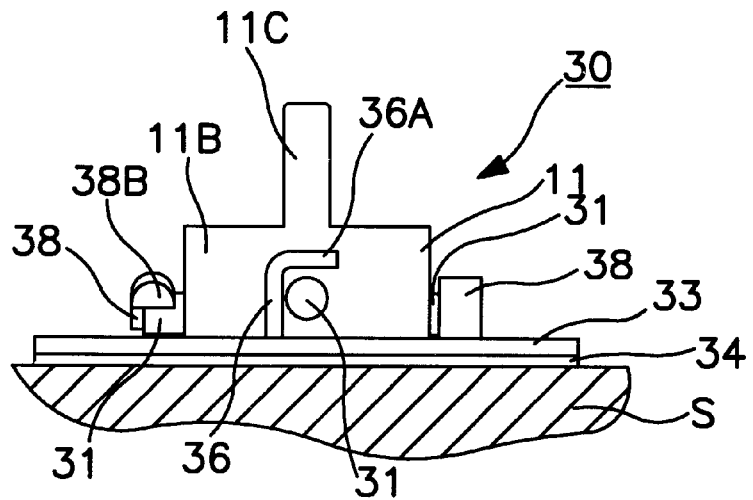
FIG. 7 is a partially enlarged section showing the relative positions of stopper pieces and locking pins of the second embodiment.

A second embodiment of the wear detection probe is identified by the numeral 30 in FIGS. 5 to 7. The basic construction of a wear detection probe 30 of the second embodiment and the construction of a disk brake are the same or similar as those of the first embodiment. Accordingly, no description is given on the structure, action and effects of the same or similar construction by identifying it by the same reference numerals. However, in the wear detection probe 30 of the second embodiment are described, four locking pins 31 substantially project at intervals of 90°. Two of the four locking pins 31 opposite to each other are exposed substantially opposite ends of a metal pin penetrating a holder 11, and the remaining two are made integrally with the holder 11. It should be noted that four separate pins may be inserted into insertion holes formed in the holder 11 or all four pins may be made of resin integrally with the holder 11. The locking pins 31 are arranged in positions to avoid a wire arrangement groove 42 formed in the outer circumferential surface of the holder 11 and extending along forward and backward directions.

A stopper mount plate 33 and a biasing mount plate 34 preferably made of the same metal material are used in order to mount the disk brake. The two mount plates 33, 34 are fixed while being placed one after the other such that the biasing mount plate 34 is in contact with the backplate S. Additionally, the biasing mount plate 34 preferably has a smaller thickness than the stopper mount plate 33.

The mount plates 33, 34 both are formed with a round through hole 35 which can be aligned with the opening edge of a mount hole Sh. The wear detection probe 30 is inserted into and withdrawn from the mount holes Sh, Bh through the through holes 35. In the mounted state, the large diameter portion 11B and the rib 11C project backwardly from the backplate S.

A pair of stopper pieces 36 (stopper means) are formed while being spaced apart by an angle more than 0° corresponding to the angular distance of one pair of locking pins 14, preferably by about 180°. The stopper pieces 36 are formed by making cuts along the edge of the through hole 35 and bending the cut portions. Each stopper piece 36 is so bent as to be substantially perpendicular (forward and backward directions F/B of the wear detection probe 30) to stopper mount plate 33. A stopper portion 36A is formed at the free end of each stopper piece 36 and projects in an angular direction, preferably in a substantially counterclockwise direction when viewed from behind (see FIG. 7).

The stopper pieces 36 are relatively unlikely to undergo an elastic deformation because they are formed at the stopper mount plate 33 which has a larger thickness than the biasing mount plate 34 and because they are bent in a direction parallel to a direction in which the wear detection probe 30 moves backward while being in contact with the rotor R. Specifically, the stopper pieces 19 undergo a small degree of elastic deformation in response to a pushing force of the rotor R in a state where braking is continued, and have a rigidity to receive the locking pins 31.

Openings 37 are formed for biasing pieces 38 of the biasing mount plate 34 substantially along the opening edge of the through hole 35 at areas distanced from the areas where the stopper pieces 36 are bent.

On the other hand, the biasing mount plate 34 is formed with a pair of biasing pieces 38 (biasing means) that extend in an angular direction, e.g. a counterclockwise direction while being spaced apart preferably by 180°. The biasing pieces are formed by making cuts in portions corresponding the openings 37 and obliquely bending the cut portions. An elastic contact portion 38A in the form of an arc opening towards the biasing mount plate 34 or substantially downward as shown in FIG. 6 is formed at the free end of each biasing piece 38. A loose movement restricting portion 38B (loose movement restricting means) in the form of an arc opening upwardly is formed at the leading end of the elastic contact portion 38A for the wear detection probe 30.

Since the biasing pieces 38 are formed at the biasing mount plate 34 having a smaller thickness than the stopper mount plate 33, they have such an elasticity as to substantially undergo an elastic deformation in response to an instantaneous impact created during the contact with the rotor R rotating at high speed as well as the pushing force of the rotor R in a state where braking is continued.

The wear detection probe 30 is assembled by inserting, the holder 11 into the mount holes Sh, Bh through the through holes 35 such that the locking pins 31 are located before both the stopper pieces 36 and the biasing pieces 38 with respect to an angular direction, e.g. the counterclockwise direction. When the contact surface 13 is brought into contact with the receiving surface Sr, the rib 11C is gripped to rotate the holder 11 in a direction opposed to the extension direction of the biasing pieces 14 and/or stopper pieces 19, preferably substantially clockwise. Then, the locking pins 31 come into contact with the loose movement restricting portions 38B, thereby engaging with the elastic contact portions 38A while causing the biasing pieces 38 to be substantially elastically deformed (see FIG. 6). In this way, the wear detection probe 10 is mounted.

In the mounted state, the wear detection probe 30 is held in a position where the contact surface 13 thereof is in contact with the receiving surface Sr by the biasing forces of the biasing pieces 38. At this time, slight clearances are left between the locking pins 31 and the stopper portions 36A (see FIG. 7). Further, since the locking pins 31 are prevented from rotating in a disengaging direction by the loose movement restricting portions 38B of the biasing pieces 38, the wear detection probe 30 is held in a specified mount position. It should be noted that an arranging direction (transverse direction of FIG. 6) of the folded portion 12A of the detection wire 12 at this time is the same as the rotating direction of the rotor R.

No description is given on the cushioning of the impact from the rotor R by the biasing pieces 38, the holding of the position of the wear detection probe 30 by the stopper pieces 36 and the cutting of the detection wire 12 since they work in the same or similar manner as in the first embodiment. Further, no description is given on the same effects as those of the first embodiment.

Effects peculiar to the second embodiment are that the locking pins 31 are shorter and the mount plates are permitted to have a smaller area as compared to the first embodiment in which the stopper pieces 16 and the biasing pieces 21 are placed one after the other at the inner and outer sides.

Figure 8:
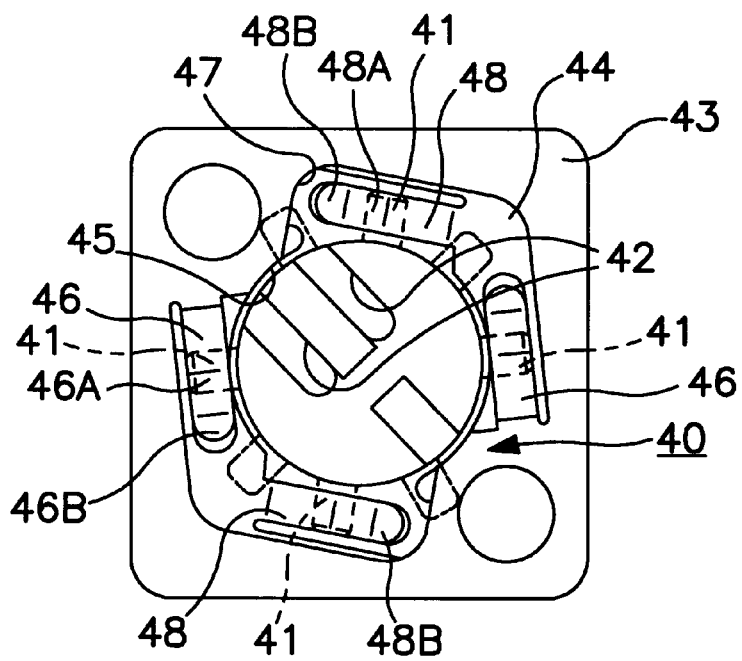
FIG. 8 is a rear view of a third embodiment.
Figure 9:
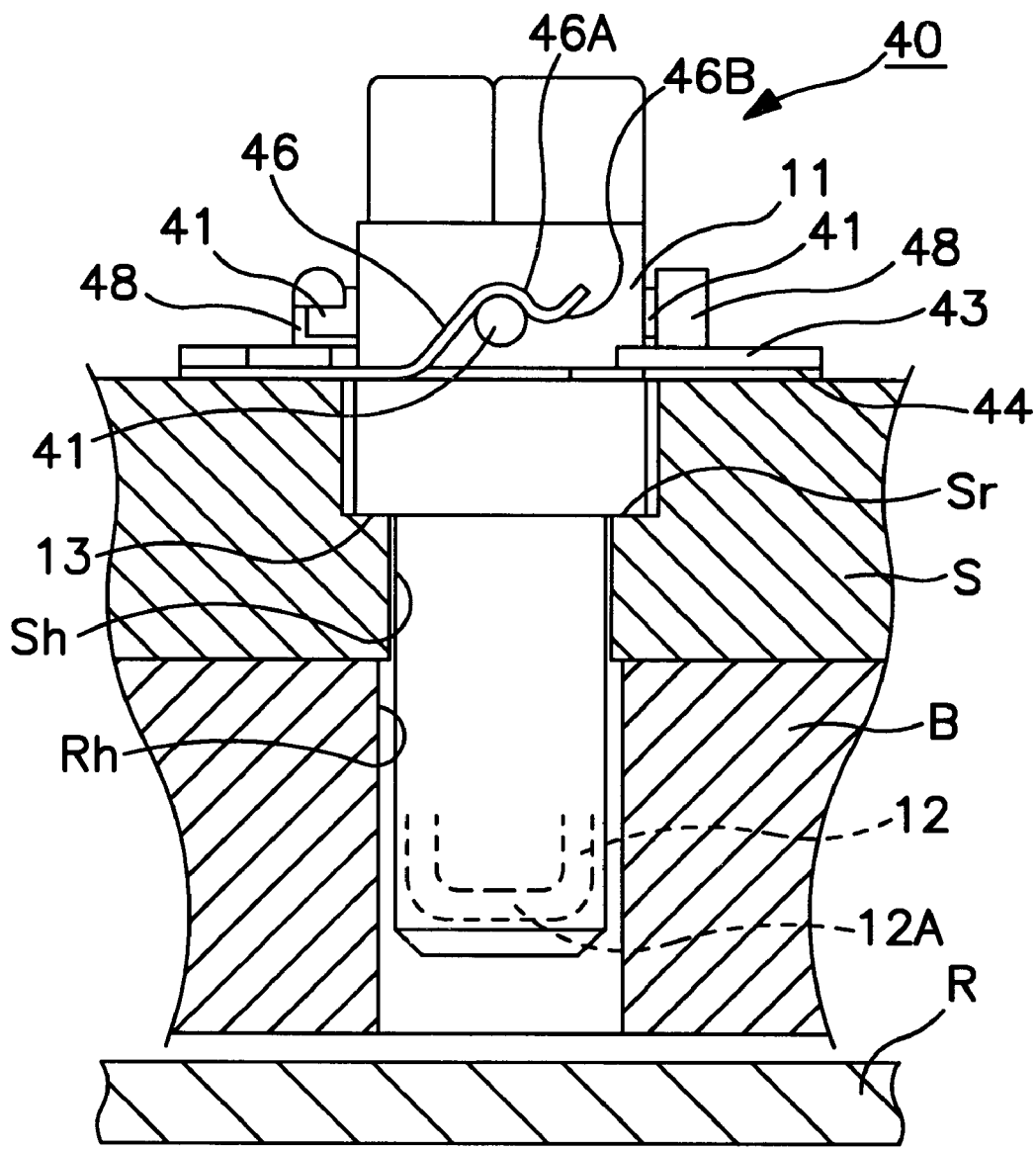
FIG. 9 is a section of the third embodiment.
Figure 10:
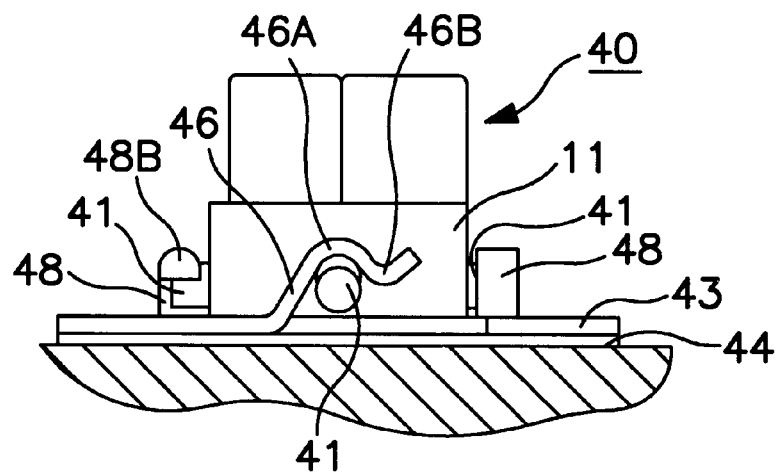
FIG. 10 is a partially enlarged section showing the relative positions of stopper pieces and locking pins of the third embodiment.

A third embodiment of the wear detection probe is identified by the numeral 40 in FIGS. 8 to 10. The basic construction of the wear detection probe 40 of the third embodiment and the construction of a disk brake are the same as those of the first embodiment. Accordingly, no description is given on the structure, action and effects of the same construction by identifying it by the same reference numerals.

The wear detection probe 40 of the third embodiment differs from the wear detection probe 10 the first embodiment in that four locking pins 41 project from the outer surface of the holder 11. The locking pins 41 may be formed by inserting separate metal pins into insertion holes formed in the outer surface of the holder 11 while being circumferentially spaced apart. The four locking pins 41 are comprised of two pairs of locking pins 41 extending in opposite directions. Axes of the two pairs do not intersect at right angles, but intersect, for example, at 70 to 80°. These locking pins 14 are arranged in such positions as to avoid a wire arrangement groove 42 formed in the outer surface of the holder 11 and extending along forward and backward directions (see FIG. 8).

It should be noted that the locking pins 41 may be a combination of pins formed by a metal pin penetrating the holder 11 and pins integrally or unitarily formed with the holder 11, a combination of pins formed by a metal pin penetrating the holder 11 and two inserted metal pins or four pins integrally or unitarily formed with the holder 11.

A stopper mount plate 43 and a biasing mount plate 44 made of the same metal material are used to bias the disk brake. However, the biasing mount plate 44 preferably is thinner than the stopper mount plate 43. The two mount plates 43, 44 are fixed while being placed one after the other such that the biasing mount plate 44 is in contact with the backplate S. Mount holes 45 of the plates 43, 44 are substantially in alignment with the mount hole Sh.

A pair of stopper pieces 46 (stopper means) having a stopper portion 46A and an arcuate loose movement restricting portion 46B for the wear detection probe 40 are formed while being spaced apart by an angular distance, e.g. about 180° (see FIG. 8) as shown in FIGS. 8 and 10. Since the stopper pieces 46 have substantially the same or similar shape and rigidity as the stopper pieces 19 of the first embodiment, no description is given thereon.

On the other hand, as shown in FIGS. 8 and 9, a pair of biasing pieces 48 (biasing means) having an elastic contact portion 48A and a loose movement restricting portion 48B are formed in positions of the biasing mount plate 44 corresponding to openings 47 of the stopper mount plate 43 while being spaced apart by 180°. Since the biasing pieces 48 also have substantially the same shape and rigidity as the biasing pieces 21 of the first embodiment, no description is given thereon.

Further, no description is given on the mounted state of the wear detection probe 40 of the third embodiment, the function of cushioning the impact from the rotor R by the biasing pieces 38, the function of holding the wear detection probe 30 in position by the stopper pieces 36, the mechanism of cutting the detection wire 12 and effects since they are the same as those of the first embodiment.

Since the longitudinal axes of the two pairs of locking pins 41 intersect not at right angles, but at a smaller angle e.g. at 70 to 80° in the third embodiment, it is sufficient that the locking pins 41 are rotated by an angle smaller as compared to a case where the longitudinal axes intersect at right angles. Accordingly, this arrangement is advantageous in the case that there is no marginal space in that angular direction.

Figure 11:
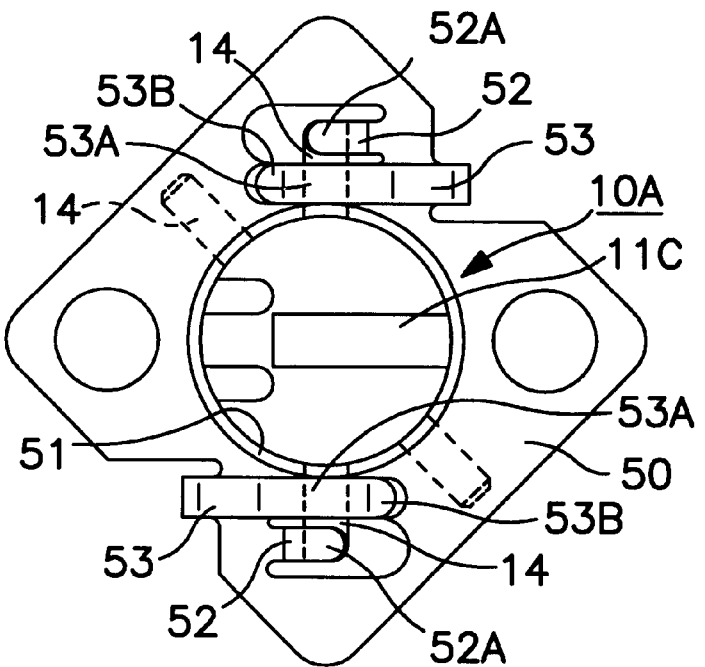
FIG. 11 is a rear view of a fourth embodiment.
Figure 12:
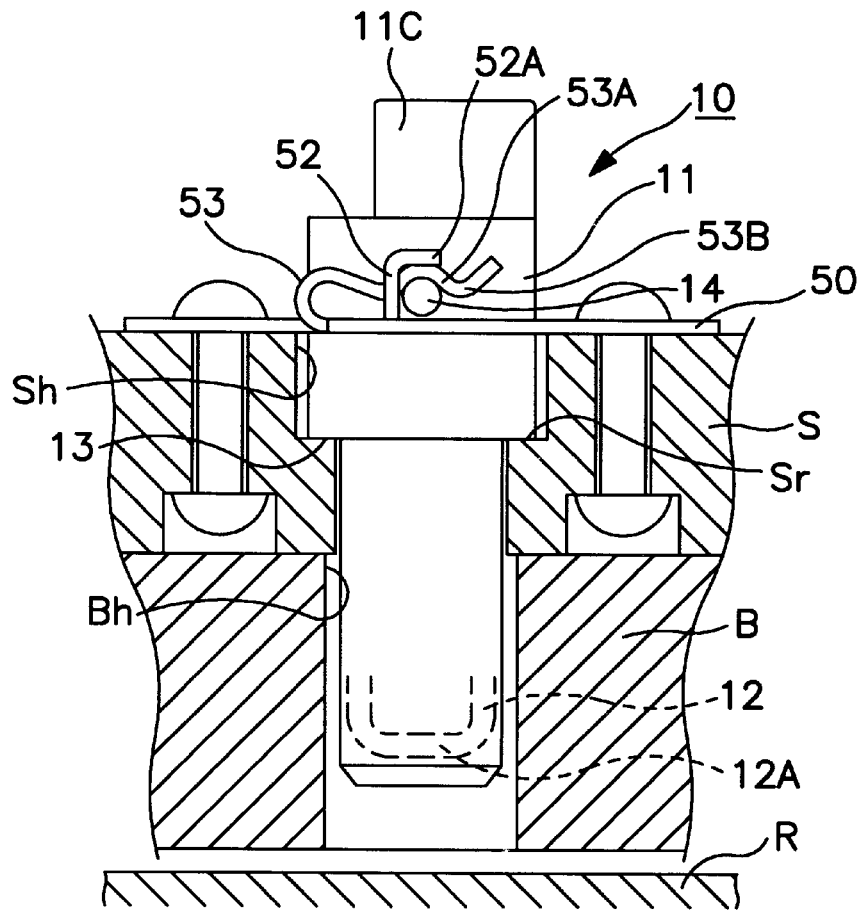
FIG. 12 is a section of the fourth embodiment.
Figure 13:
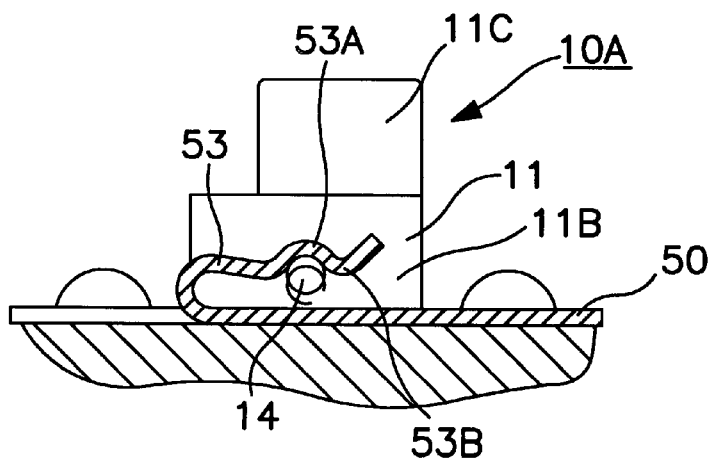
FIG. 13 is a partially enlarged section showing the relative positions of stopper pieces and locking pins of the fourth embodiment.
Figure 14:
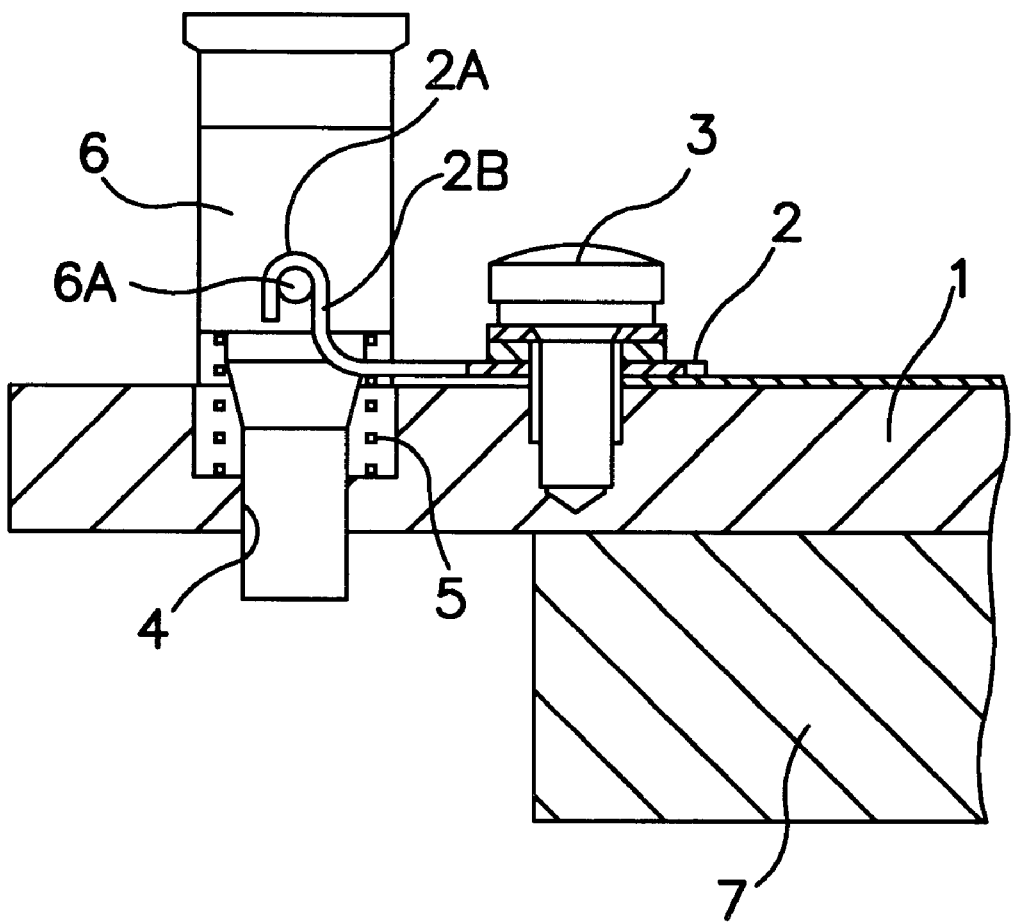
FIG. 14 is a side view partly in section of a prior art mount construction.

A fourth embodiment of the wear detection probe is identified by the numeral 10A in FIGS. 11 to 13. The basic construction of the wear detection probe 10A of the fourth embodiment and the construction of a disk brake are the same as or similar to those of the first embodiment. Accordingly, no description is given on the structure, action and effects of the same construction by identifying it by the same reference numerals.

To mount the wear detection probe 10A on the disk brake, a single metal mount plate 50 is used. The mount plate 50 is fixed to the rear surface of the backplate S such that a through hole 51 thereof is aligned with the mount hole Sh. The material and thickness of the mount plate 50 are the same as the stopper mount plates 15, 33, 43 of the first to third embodiments.

The mount plate 50 is formed with a pair of stopper pieces 52 (stopper means) each of which has a stopper portion 52A. The stopper pieces 52 are spaced apart by an angle greater than 0°, preferably about 180° by making cuts in portions slightly distanced from the through hole 51 and bending the cut portions. Since the stopper pieces 52 have substantially the same shape and rigidity as the stopper pieces 36 of the second embodiment, no description is given thereon.

The mount plate 50 is formed with a pair of biasing pieces 53 (biasing means) extending in an angular direction, e.g. in a counterclockwise direction by folding portions extending from its periphery. Each biasing piece 53 is located between the corresponding stopper piece 52 and the though hole 51 and extends along the mount plate 50 as a whole. Each biasing piece 53 has an elastic contact portion 53A at the leading edge thereof in the form of an arc opening toward the mount plate 50 or the wear detection probe 10 e.g. downwardly in FIG. 13. Each biasing piece 53 also has a loose movement restricting portion 53B (loose movement restricting means) in the form of an arc opening upwardly formed at the leading end of the elastic contact portion 53A. Since the biasing pieces 53 of the fourth embodiment are substantially thicker or have a greater rigidity than the biasing pieces 21, 38, 46 of the first to third embodiments, the folded portions have a longer length in view of the greater thickness or rigidity. Accordingly, the biasing pieces 53 have such an elasticity as to undergo an elastic deformation in response to a pushing force of the rotor R in a state where braking is continued, as well as in response to an instantaneous impact created during the impact with the rotor R.

The wear detection probe 10A is assembled by inserting the holder 11 into the mount hole Sh through the through hole 51. With the contact surface 13 held in contact with the receiving surface Sr, the rib 11C is gripped to rotate the holder 11 clockwise. The locking pins 14 then come into contact with the arcuate loose movement restricting portions 53B for the wear detection probe 10A. Thus, the locking pins 14 engage with the elastic contact portions 53A while causing the biasing pieces 53 to be elastically deformed (see FIGS. 12 and 13). In this way, the wear detection probe 10A is mounted.

In the mounted state, the wear detection probe 10A is held in a position where the contact surface 13 thereof is in contact with the receiving surface Sr by the biasing forces of the biasing pieces 53, and slight clearances are left between the locking pins 14 and the stopper portions 52A (see FIG. 12). Further, since the locking pins 14 are prevented from rotating in a disengaging direction by the loose movement restricting portions 53B of the biasing pieces 53, the wear detection probe 10A is held in a position where the arranging direction (transverse direction of FIG. 12) of the folded portion 12A of the detection wire 12 is the same as the rotating direction of the rotor R.

It should be noted that no description is given on the function of cushioning the impact from the rotor R by the biasing pieces 53, the function of holding the wear detection probe 30 in position by the stopper pieces 52 and the mechanism of cutting the detection wire 12 since they are the same as those of the first embodiment.

The biasing pieces 53 and the stopper pieces 52 of the fourth embodiment also are similar to the first embodiment.

Accordingly, the function of cushioning the impact from the rotor R rotating at high speed and the function of holding the wear detection probe 10A in the specified position during the contact with the rotor R can be performed simultaneously. Further, since the biasing pieces 53 and the stopper pieces 52 are formed separately at the mount plate 50, the cushioning performance by the biasing pieces 53 and the holding performance by the stopper pieces 52 can be set with high degree of freedom. Additionally, since the biasing pieces 53 are provided with the arcuate loose movement restricting portions 53B for the wear detection probe 10A, the wear detection probe 10A can be held in the specified position regardless of whether or not it is in contact with the rotor R. Also production costs for the fourth embodiment can be reduced since the single mount plate 50 is used.

The present invention is not limited to the described and illustrated embodiment but, for example, the following embodiments also are embraced by the technical scope of the present invention as defined in the claims. Besides the following embodiments, a variety of other changes can be made without departing from the scope and spirit of the invention as defined in the claims.

Although the receiving means is formed by forming a step in the inner surface of the mount hole of the brake lining member in the foregoing embodiments, it may be formed in the brake lining member or in the mount plate according to the invention.

Although the locking means is in the form of pins in the foregoing embodiments, it may be in the form of rib(s) or flange(s) elongated along forward and backward directions according to the invention. In the case of the flange-shaped locking means, the biasing means and the stopper means are locked from the outer side.

Although the wear detection probe is mounted and detached by being rotated in the foregoing embodiments, it may be done so by being slid.

In the first to third embodiments, the biasing mount plate and the stopper mount plate are made of the same material and have different thicknesses as a means for giving an elasticity to the biasing pieces and giving a rigidity to the stopper pieces. However, according to the invention, both mount plates may have the same thickness, but be made of different materials.

Although the biasing mount plate is held in contact with the backplate in the first to third embodiments, the stopper mount plate may be held in contact with the backplate according to the invention.

Although the stopper pieces are arranged at the inner side and the biasing pieces are arranged at the outer side in the first embodiment, a reversed arrangement may be employed according to the invention. Although the stopper pieces are arranged at the outer side and the biasing pieces are arranged at the inner side in the fourth embodiment, a reversed arrangement may be employed according to the invention.

Although the biasing pieces 53 and the stopper pieces 52 are arranged at the inner and outer sides in the same circumferential position in the fourth embodiment, they may be circumferentially displaced from each other.

What is claimed is:

1. A mount construction of a wear detection probe for detecting that a brake lining has reached an operating limit when a detection wire provided in the wear detection probe is cut by being abraded by a rotor, comprising:
   at least one lock projecting from the wear detection probe,
   a biasing means resiliently engaging the lock and elastically pushing the wear detection probe toward the rotor; and a stopper facing a side of the lock that faces away from the rotor and spaced from the lock when the biasing means is resiliently engaged with the lock and elastically pushing the wear detector probe toward the rotor, the stopper cooperating with the lock when the wear detection probe moves backward against a biasing force of the biasing means by action of an external force for limiting movement of the wear detection probe away from the rotor.

2. A mount construction according to claim 1, wherein the biasing means has less flexible rigidity than the stopper.

3. A mount construction according to claim 1, wherein a backplate is provided for fixedly supporting the brake lining and supporting the wear detection probe for movement toward and away from the rotor.

4. A mount construction according to claim 3, wherein a receiving seat is provided at the backplate for restricting movement of the wear detection probe toward the rotor.

5. A mount construction according to claim 4, comprising a biasing mount plate fixed to the backplate, the biasing means being unitary with the biasing mount plate, and a stopper mount plate fixed to the backplate, the stopper being unitary with the stopper mount plate, the thickness of the biasing mount plate being less than that of the stopper mount plate.

6. A mount construction according to claim 4, wherein both the biasing means and the stopper are elastic pieces formed on a single mount plate fixed to the backplate, the elastic pieces defining the biasing means and the stopper having different respective lengths.

7. A mount construction according to claim 6, wherein a plurality of locks project in circumferentially spaced positions at the periphery of the wear detection probe, and wherein the biasing means and the stopper are arranged in positions circumferentially displaced from each other to interact with different respective locks of the wear detection probe.

8. A mount construction according to claim 1, wherein at least one of the biasing means and the stopper is provided with a restricting means for permitting the lock to be displaced to engagement positions with the biasing means and the stopper as the wear detection probe is rotated and restricting a loose movement of the lock in the engagement positions.

9. A mount construction according to claim 1, wherein the biasing means and the stopper are spaced from one another.

10. A mount construction according to claim 9, wherein the probe is substantially cylindrical, the biasing means and the stopper being disposed at different radial distances from the probe.

11. A mount construction according to claim 10, wherein a plurality of locks project from the wear detection probe, the mount construction comprising a corresponding plurality of biasing means and a corresponding plurality of stoppers, the biasing means and the stoppers being disposed in pairs, with each pair of said biasing means and said stopper being aligned with a selected one of the locks, the biasing means and the stopper in each said pair being disposed at different radial distances from the wear detection probe.

12. A wear detection probe according to claim 10, wherein the biasing means and the stopper are circumferentially spaced from one another about the wear detection probe.

13. A mount construction for a wear detection probe that detects when a brake lining has reached an operating limit by detecting when a detection wire in the wear detection probe is abraded and cut by a rotor, a backplate being secured to a side of the brake lining opposite the rotor, the backplate having an aperture extending therethrough, and the wear detection probe passing through the aperture, the backplate having a support surface for limiting movement of the wear detection probe toward the rotor, the mount construction comprising:

at least one pair of angularly spaced locks projecting from the wear detection probe, each said lock having a surface facing away from the rotor;

a plurality of biasing members connected to the backplate in proximity to the aperture through the backplate, the biasing members each engaging the surface of one said lock that faces away from the rotor and resiliently urging said wear detection probe toward the rotor; and a plurality of stoppers, each said stopper being spaced from the surface of one said lock that faces away from the rotor such that the lock is between the stopper and the rotor, each said stopper being spaced from the respective lock when the biasing members are resiliently urging the wear detecting probe toward the rotor, the stopper being sufficiently rigid to restrict movement of the wear detection probe away from the rotor in response to an external force that causes a resilient yielding of the biasing means.

14. The mount construction of claim 13, wherein each said biasing means is spaced from each said stopper.

15. The mount construction of claim 13, further comprising a biasing member mount plate secured to the backplate, each said biasing means extending from the biasing means mount plate, the mount construction further comprising a stopper mount plate secured to the backplate, the stoppers extending from the stopper mount plate.

16. The mount construction of claim 15, wherein the stopper mount plate is formed from a material less resilient than the biasing means mount plate.

* * * * *